(12) United States Patent
MacKillop (10) Patent No.: US 11,019,711 B2
(45) Date of Patent: May 25, 2021

(54) STATIC-NEUTRALIZATION SYSTEM AND HIGH-VOLTAGE POWER SUPPLY FOR USE IN CONJUNCTION THEREWITH

(71) Applicant: Static Clean International, Inc., North Billerica, MA (US)

(72) Inventor: Kenneth Martin MacKillop, Lowell, MA (US)

(73) Assignee: STATIC CLEAN INTERNATIONAL, INC., North Billerica, MA (US)

( * ) Notice: Subject to any disclaimer, the term of this patent is extended or adjusted under 35 U.S.C. 154(b) by 192 days.

(21) Appl. No.: 16/258,811

(22) Filed: Jan. 28, 2019

(65) Prior Publication Data

US 2019/0239327 A1 Aug. 1, 2019

Related U.S. Application Data

(60) Provisional application No. 62/622,851, filed on Jan. 27, 2018.

(51) Int. Cl.
*H05F 3/04* (2006.01)
*H02M 5/12* (2006.01)
*H02M 1/00* (2006.01)

(52) U.S. Cl.
CPC ............... *H05F 3/04* (2013.01); *H02M 5/12* (2013.01); *H02M 2001/0009* (2013.01)

(58) Field of Classification Search
CPC ......... H01T 13/58; H01T 13/60; H01T 23/00; H05F 3/00; H05F 3/02; H05F 3/04; H02M 5/12; H02M 2001/0009; G01R 19/0007; G01R 19/2513; G01R 31/14
See application file for complete search history.

(56) References Cited

U.S. PATENT DOCUMENTS

| | | | | |
|---|---|---|---|---|
| 3,120,626 | A | * 2/1964 | Schweriner | ............... H05F 3/04 361/230 |
| 4,097,814 | A | 6/1978 | Cohn | |
| 4,980,811 | A | 12/1990 | Suzuji et al. | |
| 6,130,815 | A | * 10/2000 | Pitel | ........................ H01T 23/00 361/212 |
| 2004/0084965 | A1 | 5/2004 | Welches et al. | |
| 2005/0286201 | A1 | 12/2005 | Jacobs et al. | |

(Continued)

*Primary Examiner* — Fred E Finch, III
(74) *Attorney, Agent, or Firm* — Kriegsman & Kriegsman (57) ABSTRACT

A static-neutralization system includes a plurality of alternating current (AC) static bars that is coupled to a common, high-voltage power supply. The power supply includes a transformer that steps up AC mains electricity to deliver high-voltage, AC power to the static bars. A monitoring circuit is provided in the power supply that determines the ionization current of the static bars through isolation of the second harmonic of the total load current. By monitoring the ionization current, the power supply can identify when the ion generation efficiency of the static bars falls beneath a user-defined threshold. The monitoring circuit additionally determines the discharge voltage of the static bars through isolation of the fourth harmonic of the total output voltage. By monitoring the discharge voltage, a voltage-suppression circuit can suspend delivery of power to the static bars upon detecting a full-discharge event, which often results from dielectric breakdown.

21 Claims, 6 Drawing Sheets

(56) References Cited

U.S. PATENT DOCUMENTS

| | | |
|---|---|---|
| 2006/0087244 A1 | 4/2006 | Regan |
| 2008/0225460 A1 | 9/2008 | Gefter et al. |
| 2008/0316773 A1* | 12/2008 | Neubarth ............ H02M 3/3384 |
| | | 363/17 |
| 2009/0127452 A1* | 5/2009 | Gorczyca ................ H01T 23/00 |
| | | 250/252.1 |
| 2009/0160259 A1 | 6/2009 | Naiknaware et al. |
| 2011/0096457 A1* | 4/2011 | Gefter ..................... H01T 23/00 |
| | | 361/230 |
| 2014/0185179 A1* | 7/2014 | Simon ...................... H05F 3/02 |
| | | 361/220 |
| 2015/0280459 A1 | 10/2015 | Yagi et al. |

\* cited by examiner

STATIC-NEUTRALIZATION SYSTEM AND HIGH-VOLTAGE POWER SUPPLY FOR USE IN CONJUNCTION THEREWITH

CROSS-REFERENCE TO RELATED APPLICATIONS

The present application claims the benefit under 35 U.S.C. 119(e) of U.S. Provisional Patent Application No. 62/622,851, inventor Kenneth Martin MacKillop, filed Jan. 27, 2018, the disclosure of which is incorporated herein by reference.

FIELD OF THE INVENTION

The present invention relates generally to static-neutralization systems and, more particularly, to high-voltage power supplies used in static-neutralization systems.

BACKGROUND OF THE INVENTION

Static-neutralization systems are well known in the art and are commonly utilized in a wide variety of different applications to remove electrostatic charges from materials with a propensity to develop static electricity, such as paper and plastic. Conventionally, static-neutralization systems, also commonly referred to in the art as ionization systems and electrostatic-discharge systems, operate by emitting a field of charged ions which neutralize oppositely polarized electrostatic charges that are present on the treated material.

Static-neutralization systems typically comprise one or more static-neutralizing bars which are electrically coupled to a common, high-voltage power supply. Once electrically coupled to the power supply, the individual static-neutralizing bars are arranged, or configured, based on the intended static removal application.

Static-neutralization bars, also commonly referred to in the art simply as static bars or static eliminators, are often constructed through capacitive coupling in order to generate high-voltage electric fields. An example of a static bar constructed through capacitive coupling is described in U.S. Pat. No. 3,120,626 to H. Schweriner, the disclosure of which is incorporated herein by reference.

Specifically, static bars which rely upon capacitive coupling typically comprise an elongated cable which is adapted to directly receive relatively high voltages (e.g. 10 kV) from the power supply to which it is connected. The elongated cable includes a center electrode (e.g. a copper wire), which is coaxially encased within a solid dielectric jacket of one or more suitable insulative materials.

A plurality of conductive discharging members is coaxially mounted onto the high-voltage cable in a spaced apart relationship along its length, typically with a plurality of dielectric spacers disposed between adjacent discharging members to maintain adequate separation. Each discharging member includes an adhesive-backed, metal foil ring in circumferential contact with the dielectric jacket of the high-voltage cable and a narrow needle, or discharge electrode, extending radially out from the foil ring, the free end of each needle terminating into a sharpened point, or tip.

The unitary element formed through the assembly of the high-voltage cable, discharging members, and dielectric spacers is, in turn, fixedly disposed within an insulative retainer, or cover, formed from an extruded polymer material. In one well-known design, the insulative cover is shaped to define a narrow, longitudinal, U-shaped channel in its top surface into which the distal end of the plurality of discharging needles project, with the tip of each needle lying generally flush with the outer planar surface of the dielectric cover to maximize ionization performance (i.e. achieve optimal flux density) as well as to ensure adequate safety. Typically, the conductive needles are arranged within the insulative retainer in an equidistantly spaced, linear configuration, with approximately 0.50-0.75 inches of separation between adjacent discharging needles.

The insulative cover is, in turn, mounted onto an elongated casing, or reference electrode, which is constructed of a suitable conductive material, such as aluminum. The conductive casing is commonly U-shaped in transverse cross-section and thereby defines an interior cavity that is dimensioned to receive the insulative cover with enough clearance so as to create an air gap therebetween.

In use, high voltage is delivered from the power supply to the center electrode. Additionally, the reference electrode is grounded. As such, capacitance is established between both (i) each discharging electrode and the center electrode (i.e. through insulation provided by the dielectric jacket) and (ii) each discharging electrode and the reference electrode (i.e. through insulation provided by insulative cover as well as the air gap defined between the insulative cover and the conductive casing). The cumulative effect of the established capacitance is that the exposed tips of the plurality of discharging needles are able to generate a uniformly distributed ionizing field from the U-shaped channel formed in the outer surface of the cover that receives the needles. As can be appreciated, the highest flux density is produced within the U-shaped channel, since it has been found that the most optimal flux path from the center electrode to the reference electrode occurs through both air and the insulative cover. Largely for this reason, the tips of the discharging electrodes are precisely positioned within the center of the U-shaped channel in a generally co-planar relationship with the outer surface of the insulative cover.

As a feature of its design, the independent capacitive coupling of a plurality of discharging electrodes to a common high-voltage wire limits the capacitance established between each discharging member and the conductive wire to a limited value (e.g. 5 pF). As a result, the effects of a potential arc-over, or shock, condition between electrodes are attenuated to the greatest extent possible.

Nonetheless, capacitively-coupled, or AC, static bars of the type described above have been found to experience certain shortcomings over time. Notably, static bars are commonly susceptible to the accumulation of contaminants present in the air within their immediate environment. For example, various types of solvents used in industrial applications, in turn, generate particulates that can collect within the longitudinal channel in the cover for the particular static bar described above.

This accumulation of particulates ultimately degrades the efficiency of ions generated by the static bar. In fact, this reduction in ion generation can ultimately result in the overall failure of the static-neutralization system to adequately remove electrostatic charges from the intended material for the designated application, which is highly undesirable.

Furthermore, in extreme situations, it has been found that the continuous accumulation of contaminants on conductively-coupled static bars can ultimately result in physical breakdown of dielectric elements. In particular, erosion of dielectric material in the insulative cover can enable a conductive path to be established between the high-voltage discharging needle and the conductive casing, this conductive path often being formed internally within the dielectric itself. As can be appreciated, the creation of a conductive path between the two aforementioned conductive elements can result in arc-over, or full-discharge, conditions. In certain environments, the generation of a spark from a full discharge can result in a fire or other similar hazardous condition.

To minimize the deleterious effects associated with particle accumulation, static bars are routinely inspected and cleaned to the greatest extent possible. However, dielectric degradation is not often readily observable and typically cannot be determined until after a catastrophic event, such as a fire.

Consequently, a set of static bars is often routinely swapped at designated time intervals. However, periodic static bar replacement often results in considerable additional costs to the user, particularly when uncompromised, high ion efficiency bars are prematurely replaced.

SUMMARY OF THE INVENTION

It is an object of the present invention to provide a new and improved static-neutralization system.

It is another object of the present invention to provide a static-neutralization system which includes at least one capacitively-coupled static bar connected to a high-voltage power supply.

It is yet another object of the present invention to provide a static-neutralization system as described above which is designed to detect any degradation of efficiency in generating an ionizing field by the at least one capacitively-coupled static bar.

It is still another object of the present invention to provide a static-neutralization system as described above which is designed to protect against full discharge by the at least one capacitively-coupled static bar.

It is yet still another object of the present invention to provide a static-neutralization system that has a limited number of parts, is inexpensive to manufacture, and is easy and safe to operate.

Accordingly, as a feature of the invention, there is provided a high-voltage power supply for at least one alternating current (AC) ionizing device, the AC ionizing device being adapted to produce an ionized electric field having a discharge voltage and an ionization current, the high-voltage power supply comprising (a) a transformer for generating a high-voltage AC power signal to be delivered to the at least one AC ionizing device, the high-voltage AC power signal comprising a load current and an output voltage, and (b) a monitoring circuit in electrical connection with the transformer, wherein the monitoring circuit is adapted to isolate at least one non-fundamental harmonic of the high-voltage AC power signal.

Various other features and advantages will appear from the description to follow. In the description, reference is made to the accompanying drawings which form a part thereof, and in which is shown by way of illustration, an embodiment for practicing the invention. The embodiment will be described in sufficient detail to enable those skilled in the art to practice the invention, and it is to be understood that other embodiments may be utilized and that structural changes may be made without departing from the scope of the invention. The following detailed description is therefore, not to be taken in a limiting sense, and the scope of the present invention is best defined by the appended claims.

BRIEF DESCRIPTION OF THE DRAWINGS

In the drawings, wherein like reference numerals represent like parts.

DETAILED DESCRIPTION OF THE INVENTION

Static-Neutralization System 11

Figure 1:
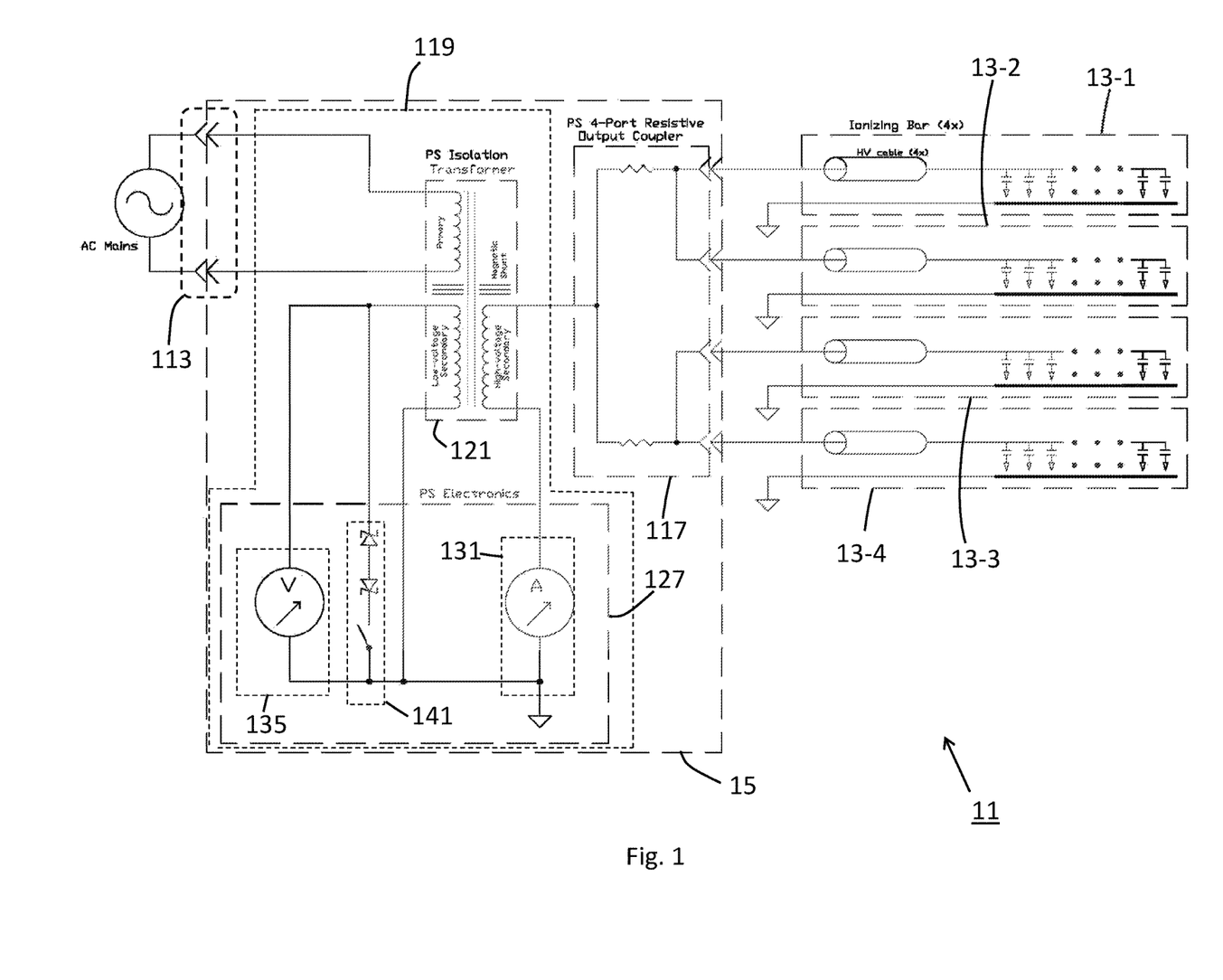
FIG. 1 is a simplified electrical schematic of a static-neutralization system constructed according to the teachings of the present invention.

Referring now to FIG. 1, there is shown a simplified schematic representation of a static-neutralization system constructed according to the teachings of the present invention, the system being identified generally by reference numeral 11. As will be explained in detail below, static-neutralization system 11 is a capacitively-coupled ionization system constructed with certain unique monitoring capabilities to ensure optimal operation as well as protect against potentially catastrophic conditions.

As defined herein, static-neutralization system 11 represents any capacitively-coupled ionization system that is designed to generate an ionized electric field for any designated purpose, such as static neutralization or air purification. As can be appreciated, capacitively-coupled system 11 is also referred to herein interchangeably as an alternating current (AC) system, since the capacitive connection inherent in its construction permits the transmission of AC signals but effectively blocks direct current (DC) signals.

As can be seen, static-neutralization, or ionization, system 11 comprises a plurality of capacitively-coupled, or AC, static-neutralizing bars 13-1 thru 13-4 which are independently connected to and powered by a common high-voltage power supply 15. As will be explained in detail below, power supply 15 is specifically designed to continuously monitor both (i) the ionization current (i.e. the current in the ionized electric field generated by any operational static-neutralizing bars 13) in order to identify, as early as possible, any degradation in ion generation, and (ii) the discharge voltage (i.e. the overall voltage generated in the output impedance of power supply 15 due to the electric-discharge, or ionization, current of bars 13) in order to identify and promptly treat any transient fault conditions. In this capacity, power supply 15 is able to maintain a suitable ionization output from static bars 13 as well as detect and treat any potentially catastrophic faults in static bars 13 resulting from dielectric breakdown.

In the industry, the measurement of the ionization current (i.e. the electric current produced in the ionized gas of the generated electric field) in conventional AC static-neutralization systems was prohibitively difficult and expensive to implement due to the presence of the considerably larger displacement current that is required to drive the overall capacitive load, both currents being delivered together as part of the total output, or load, current from the power supply. As part of the present invention, applicant has recognized that certain harmonics of the operating frequency of the total load current that is output from power supply 15 are directly attributable to the largely nonlinear ionization load impedance of air, whereas other harmonics are directly attributable to the largely linear overall load impedances. Accordingly, by examining certain AC signal harmonics of the power-supply load current, the ionization current can be readily isolated and, in turn, continuously monitored to identify any degradation in ion field generation (e.g. as a result of particulate accumulation on any of the individual static bars 13).

In a similar fashion, applicant has also recognized a direct, measurable correlation between the discharge voltage (i.e. the voltage developed by the output impedance of power supply 15 and the load of static bars 13 during ion generation) and certain harmonics of the operating frequency of the larger output voltage delivered from power supply 15. In particular, applicant has recognized that transients associated with full discharge between electrodes in each static bar 13 (i.e. high-energy continuous electric discharge fully bridging the gap between an anode and a cathode, also known as "arc discharge" or as "arc-over", usually induced by an incipient or developed dielectric fault within ionization system 11) events introduce considerably unstable waveform characteristics in the power supply output voltage due to time-variant magnitude of collapse of the arc-sustaining electric field, the waveform recovering at least once per half-cycle of its operating frequency. By contrast, the measured output voltage during ideal operating conditions produces a highly stable and continuous waveform. Therefore, any instability, or randomness, in the power supply output voltage waveform, which is normally stable and continuous from cycle-to-cycle, creates time-variant harmonic distortions that can be readily identified, thereby providing an immediate, real-time indication of transient full discharge.

Static-Neutralizing Bar 13

As referenced above, a plurality of static-neutralizing bars 13-1 thru 13-4 is releasably coupled to corresponding output connectors on power supply 15. In this manner, each static bar 13 is designed to receive high-voltage power from supply 15 and, in turn, generate an ionized electric field.

As defined herein, static-neutralizing bar 13 represents any capacitively-coupled, or AC, ionizing device, such as the static eliminator disclosed in U.S. Pat. No. 3,120,626 to H. Schweriner, the disclosure of which is incorporated herein by reference. In fact, the details of bar 13 are provided herein principally to help illustrate certain novel features of high-voltage power supply 15. Accordingly, it is to be understood that modifications to the general construction and operation of each static-neutralizing bar 13 could be recognized without departing from the spirit of the present invention. Additionally, it should be noted that system 11 is not limited to a four-bar implementation, but rather, could be configured to support the operation of an alternative number of individual static bars 13 without departing from the spirit of the present invention.

Figure 2:
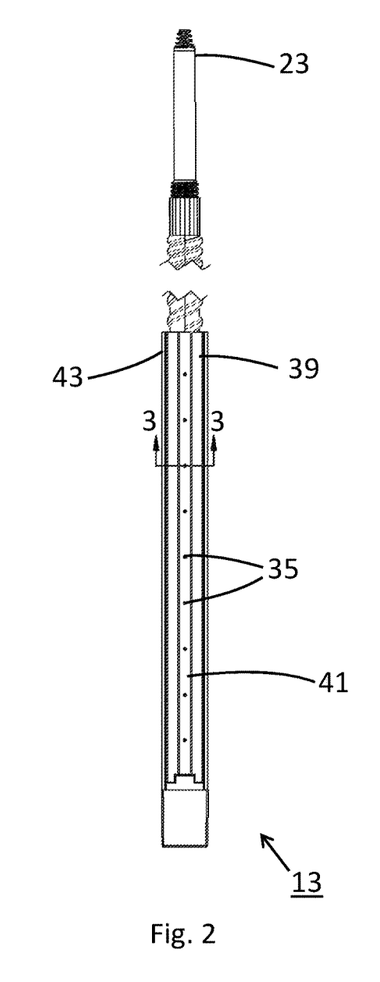
FIG. 2 is a fragmentary, top view of one of the static bars shown in FIG. 1.
Figure 3:
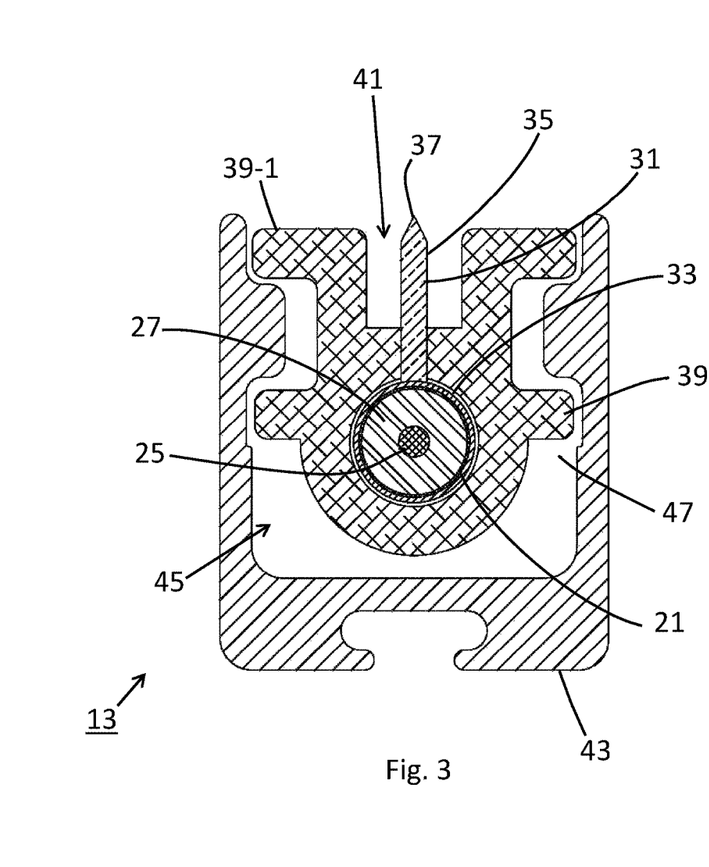
FIG. 3 is an enlarged, section view of the static bar shown in FIG. 2, taken along lines 3-3.

Referring now to FIGS. 2 and 3, there are shown top plan and section views, respectively, of one of static-neutralizing bars 13. As can be seen, static bar 13 comprises an elongated cable 21 that is provided with an externally-threaded, spring-biased coupler 23 at one end to facilitate connection with power supply 15. In this manner, cable 21 is adapted to receive relatively high voltages (e.g. 10 kV) from power supply 15 to which it is connected.

As seen most clearly in FIG. 3, elongated cable 21 comprises a center electrode 25, such as a copper wire, which is coaxially encased within a solid dielectric jacket 27 of suitable insulative material.

A plurality of conductive discharging members 31 is coaxially mounted onto high-voltage cable 21 in a spaced apart relationship along its length. Although not shown herein, a plurality of dielectric spacers is sometimes disposed between adjacent discharging members to maintain adequate separation.

Each discharging member 31 includes an adhesive-backed, metal foil ring 33 in circumferential contact with dielectric jacket 27 of high-voltage cable 21 and a narrow needle, or discharge electrode, 35 extending radially out from foil ring 33, the free end of each needle 35 terminating into a sharpened point, or tip, 37.

The unitary element formed through the assembly of high-voltage cable 21, discharging members 31 and dielectric spacers is, in turn, fixedly disposed within an insulative retainer, or cover, 39 formed from an extruded polymer material. As shown herein, insulative cover 39 is preferably shaped to define a narrow, longitudinal, U-shaped channel 41 in its top surface into which the distal end of discharging needles 35 project, with tip 37 of each needle 35 lying generally flush with the outer planar surface 39-1 of dielectric cover 39 to maximize ionization performance as well to ensure adequate safety. Typically, conductive needles 35 are arranged within insulative retainer 39 in an equidistantly spaced, linear configuration, as seen in FIG. 2, with approximately 0.50-0.75 inches of separation between adjacent discharging needles 35.

As seen most clearly in FIG. 3, insulative cover 39 is, in turn, mounted onto an elongated casing, or reference electrode, 43 that is constructed of a suitable conductive material, such as aluminum. In the present embodiment, conductive casing 43 is generally U-shaped in transverse cross-section and thereby defines an interior cavity 45 that is dimensioned to receive insulative cover 39 with adequate clearance, but also so as to maximize the air gap 47 therebetween and hence minimize shunt capacitance between discharging members 31 and reference electrode 43 as well as to maximize voltage at electrode tips 37.

In use, high voltage is delivered from power supply 15 to center electrode 25. Additionally, reference electrode 43 is grounded. As such, desired series capacitance is established between each discharging electrode 35 and center electrode 25 (i.e. through insulation provided by dielectric jacket 27) and undesired shunt capacitance is established between each discharging electrode 35 and reference electrode 43 (i.e. through insulation provided by insulative cover 39 as well as air gap 47). In this manner, the application of high-voltage power onto conductive central electrode 25 yields from tips of needles 35 a commensurate partial discharge (i.e. a low-energy, discontinuous electric discharge that only partially bridges the gap between discharging electrode 35 and reference electrode 43, also known as "corona discharge"). This partial discharge thereby generates ions at electrode tips 37 that are uncollected by reference electrode 43 and are free to move in the immediate environment of channel 41. Continued generation of newer ions electromotively propels older ions of the same polarity, generated during a common half cycle of the AC mains, away from electrode tips 37 towards the target item. The ionized air particles are thus utilized to neutralize oppositely polarized static charges present in the item to be neutralized.

High-Voltage Power Supply 15

As referenced above, high-voltage power supply 15 is designed to provide the necessary power to static bars 13. Furthermore, as unique features of its design, power supply 15 is specifically constructed to continuously monitor both (i) the ionization current (i.e. the current in the ionized electric field generated by any operational static-neutralizing bars 13) in order to identify, as early as possible, any degradation in ion generation, and (ii) the discharge voltage (i.e. the voltage induced by the ionization current of static bars 13 into the output impedance of power supply 15) in order to identify and promptly treat any transient fault conditions. In this capacity, power supply 15 is able to maintain a suitable ionization output from static bars 13 as well as detect and treat any potentially catastrophic faults in static bars 13 resulting from dielectric breakdown.

Power supply 15 is similar in construction to the high-voltage alternating current (AC) power supply disclosed in U.S. Pat. No. 9,648,770 to K. M. MacKillop, the disclosure of which is incorporated herein by reference. Specifically, as seen most clearly in FIG. 4, power supply 15 comprises (i) an outer housing, or chassis, 111, (ii) an input power connection module 113 mounted in a front panel 111-1 of housing 111, (iii) a power switch module 115 mounted in front panel 111-1 of housing 111, (iv) an output coupler 117 mounted in front panel 111-1 of housing 111, and (v) an internally-housed power supply circuit (not shown) for delivering high-voltage power to output coupler 117 using alternating current (AC) mains electricity supplied via input power connection module 113.

Figure 5:
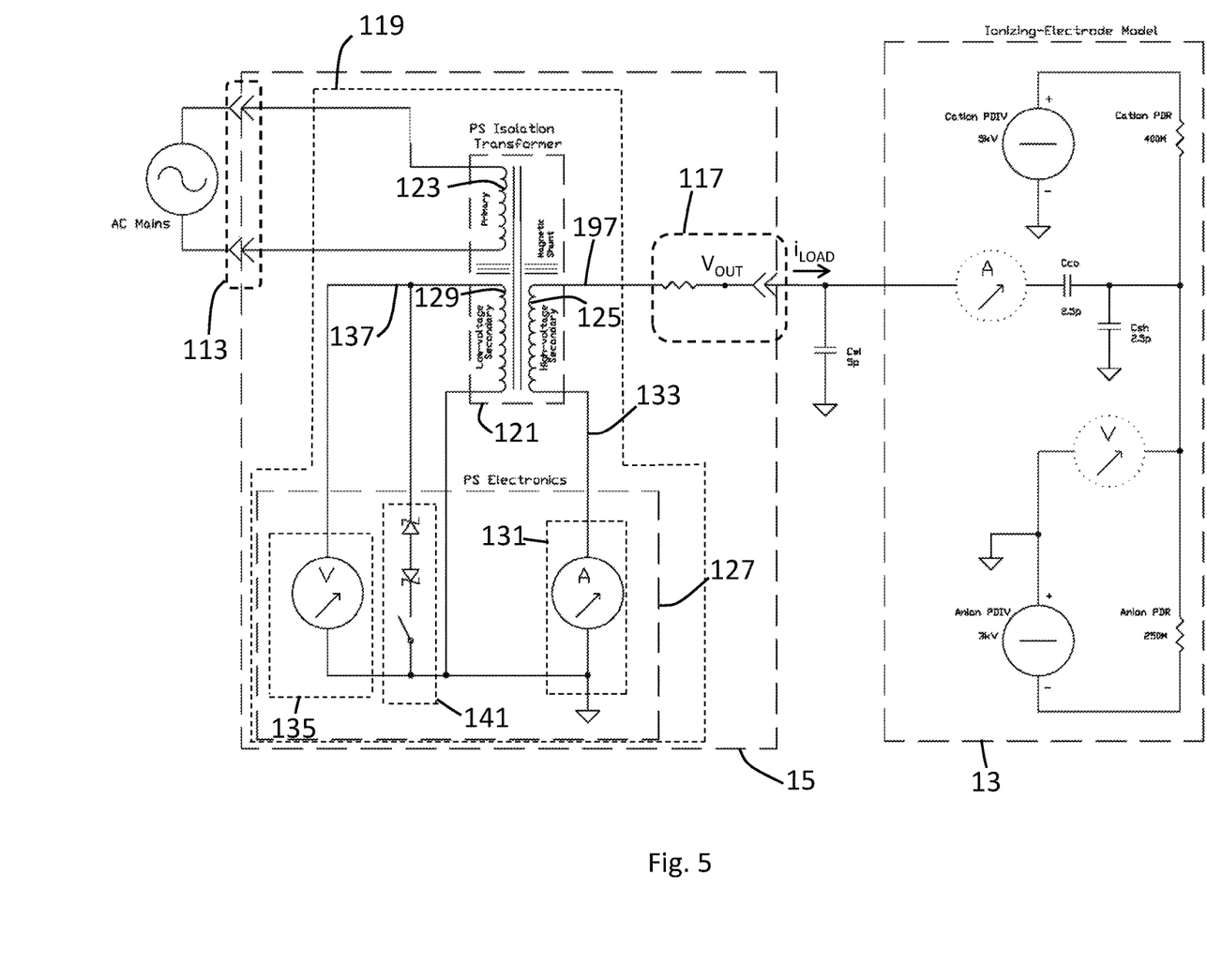
FIG. 5 is a simplified electrical schematic of the high-voltage power supply shown in FIG. 1, the power supply being shown with a single discharging electrode of a single static bar connected thereto in order to illustrate certain novel features of the present invention.

Referring now to FIG. 5, there is shown a simplified electrical schematic depicting an operational model of a single static bar 13 connected to power supply 15, the schematic being particularly useful in understanding certain principal features of the present invention. Specifically, as can be seen, a power supply circuit 119, which is housed within power supply chassis 111, comprises a high-voltage transformer 121 for stepping up alternating current (AC) mains electricity provided from an AC power source coupled to module 113 and, in turn, delivering the high-voltage output to coupler 117. As can be seen, coupler 117 is adapted to receive at least one capacitive load, such as an ionizing bar 13. In this manner, power supply 15 operates at AC mains frequency and provides high-voltage AC power (in the order of 7.5 kV) to any static bars 13 connected thereto.

Power supply 15 is similar to the high-voltage AC power supply disclosed in the '770 patent in that high-voltage transformer 121 steps up alternating current (AC) mains electricity received from an alternating current (AC) power source via a primary winding 123 and, in turn, delivers the high-voltage output produced therefrom to coupler 117 via a high-voltage secondary winding 125.

However, power supply 15 differs from the high-voltage AC power supply disclosed in the '770 patent in that power supply circuit 119 additionally includes both a measurement, or monitoring, circuit 127 as well as a low-voltage secondary winding 129 that together allow for the measurement of both the ionization current and discharge voltage of static bars 13 in order to ensure suitable operational efficiency as well as protect against potentially catastrophic conditions. As such, the integration and use of monitoring circuit 127 and winding 129 in power supply 15 serve as principal novel features of the present invention.

More specifically, as shown in FIG. 5, monitoring circuit 127 comprises a current measurement circuit 131 that receives the high-voltage output from transformer 121 via terminating ground wire 133 of high-voltage secondary winding 125. As will be explained further in detail below, current measurement circuit 131 is able to not only measure the total load current $i_{LOAD}$ output from power supply 15 but also determine the ionization current (i.e. the current in the ionized electric field generated by any operational static-neutralizing bars 13) in order to identify, as early as possible, any degradation in ion generation, which is a principal object of the present invention.

Additionally, monitoring circuit 127 comprises a voltage measurement circuit 135 that receives the low-voltage output from transformer 121 via terminating output wire 137 of low-voltage secondary winding 129. As will be explained further in detail below, voltage measurement circuit 135 is able to not only measure the output voltage $V_{ouT}$ delivered from power supply 15 but also determine the discharge voltage (i.e. the voltage induced by the electric discharge of bars 13) in order to identify any transient, full-discharge, or arc-over, events, which is a principal object of the present invention.

As a further feature of the invention, monitoring circuit 127 additionally comprises an arc-over suppression circuit 141. As will be explained further in detail below, arc-over suppression circuit 141 is designed to attenuate, or reduce, the output voltage $V_{OUT}$ delivered to static bars 13 upon detection by monitoring circuit 127 of a full-discharge event, which is a principal object of the present invention.

Figure 6:
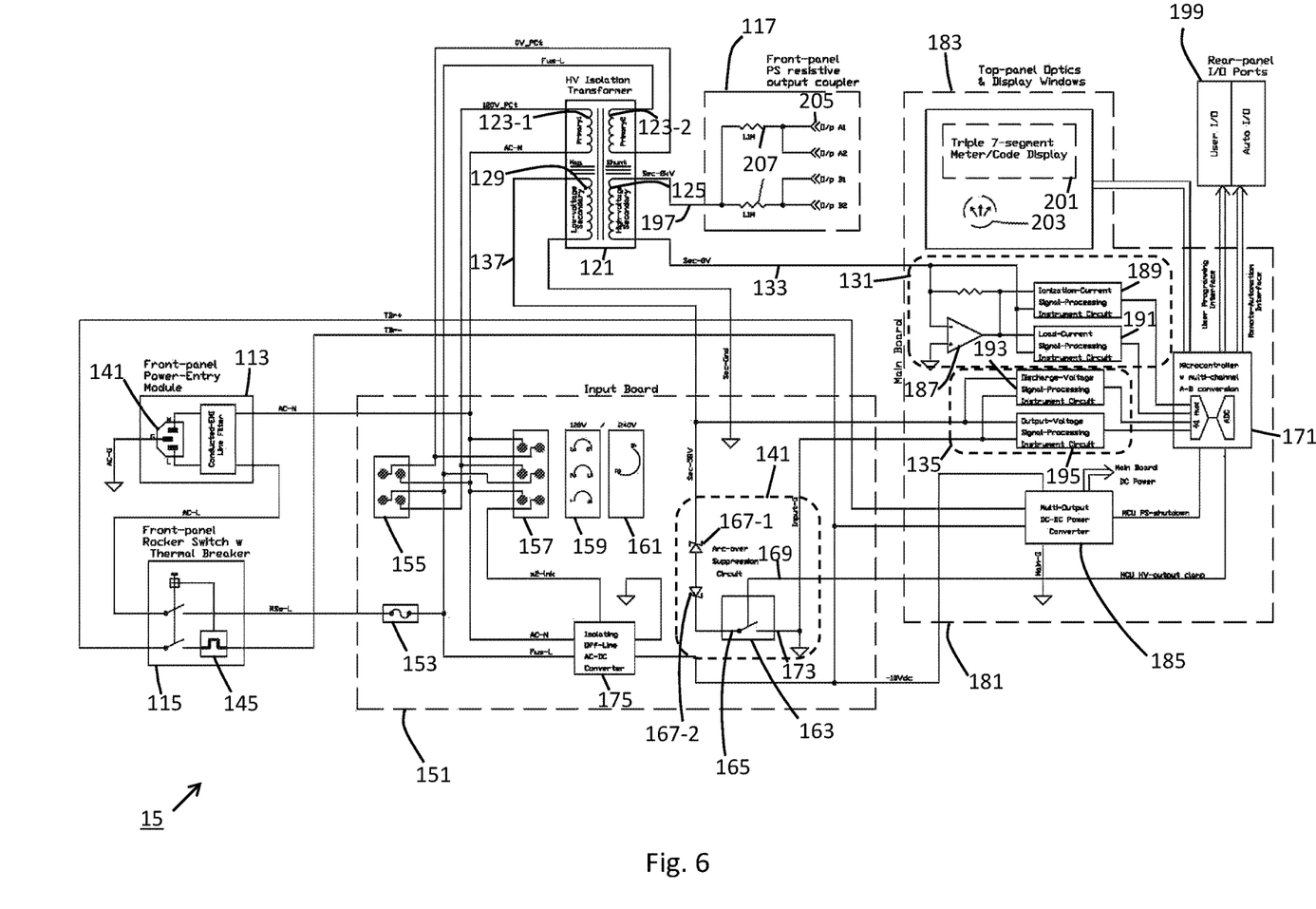
FIG. 6 is a detailed electrical schematic of the high-voltage power supply shown in FIG. 1.

Referring now to FIG. 6, there is shown a more detailed electrical schematic of power supply 15 that is particularly useful in understanding its novel construction and operation. As can be seen, input power connection module 113 is represented herein as comprising a three-prong, receptacle-type power connector 141, which is adapted to receive a plug from a power cable (not shown) connected to an AC power source. The neutral, or return, terminal of connector 141 is connected to transformer 121 by a first primary winding 123-1.

Figure 4:
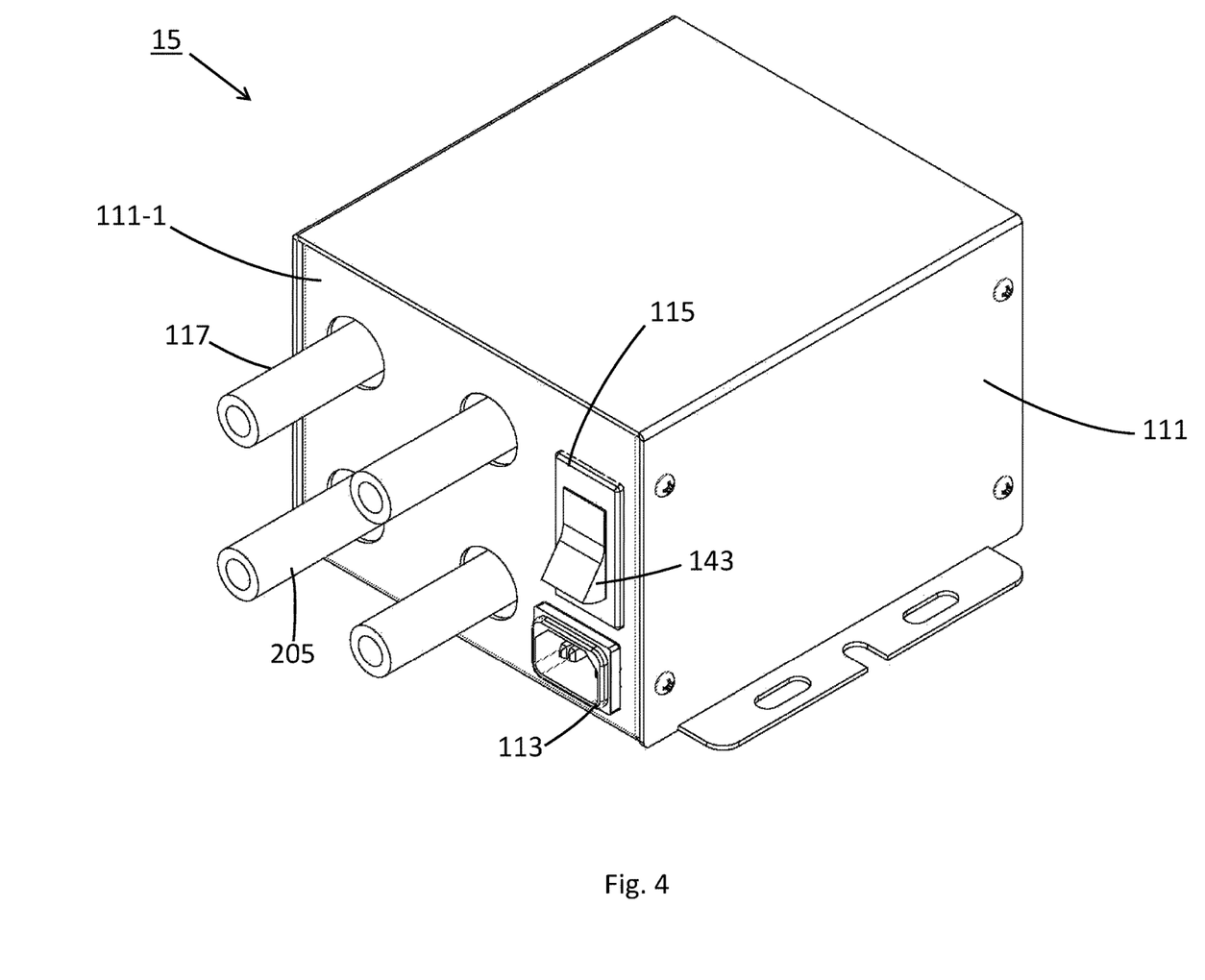
FIG. 4 is a front perspective view of the high-voltage power supply shown in FIG. 1.

The hot, or line, terminal of connector 141 is connected to switch module 115 which, in turn, supplies input power to transformer 121 through a second primary winding 123-2. As seen in FIG. 4, switch module 115 comprises an externally accessible rocker switch 143 that provides manual means for activating and deactivating operation of power supply 15. Additionally, as shown in FIG. 6, switch module 115 includes a thermal breaker 145, which is ganged to rocker switch 143 and can be armed for applied-current actuation to trigger automated removal or shutdown of the delivery of AC mains electricity to all downstream components in power supply circuit 119 upon detection by monitoring circuit 127 of a full-discharge, or arc-over, event, as will be explained further in detail below. By manually resetting rocker switch 143, AC power can be returned to power supply circuit 119.

An input printed circuit board (PCB) 151 is provided to facilitate connection of input power connection module 113 and switch module 115 to first and second primary windings 123-1 and 123-2 of transformer 121. As can be seen, a fuse 153 is mounted on board 151 and is connected in series along the input voltage path between switch module 115 and second primary winding 123-2. Additionally, a first board header 155, a second board header 157, parallel-connection jumper plug 159, and series-connection jumper plug 161 are mounted on board 151, with headers 155 and 157 connected along the input voltage path delivered to transformer 121. Together, header 155, header 157, jumper plug 159, and jumper plug 161 enable power supply 15 to be configured to accommodate either 120v or 240v AC mains electricity.

Arc-over suppression circuit 141 is mounted on input board 151 and comprises a single-pole, single-throw semiconductor-circuit 163 that includes a normally ungrounded, or floating, switched terminal 165 connected to low-voltage secondary winding 129 through a pair of series-opposing Zener diodes 167-1 and 167-2 and a control terminal 169 that is connected to a microcontroller 171 designed to regulate the principal operations of power supply 15. The other switched terminal 173 of switch 163 is connected to ground. Under normal, partial discharge conditions, terminal 165 is disconnected from grounded terminal 173, thereby enabling high-voltage power to be delivered to output coupler 117 and any static bars 13 coupled thereto. However, under abnormal, full-discharge conditions, terminal 165 is grounded through terminal 173 and the potential across low-voltage secondary winding 129 is clamped and reduced through diodes 167-1 and 167-2, thereby also reducing the potential across high-voltage secondary winding 125 and thereby reducing the supply of power to static bars 13, which may be experiencing hazardous arc-over conditions. As can be appreciated, this reduction in output voltage (by approximately one-half of its peak voltage) is considered adequate enough to squelch a conventional arc-over event.

As can be appreciated, anti-series Zener diodes 167 are disconnected and do not limit power-supply output voltage $V_{OUT}$ during normal operation and, at the same time, prevent overheating of the low-voltage secondary winding 129 and of transformer 121 during a voltage-clamping event. As a result, diodes 167 enable the relative size and cost of transformer 121 to be minimized.

Lastly, a switch-mode power converter 175 is mounted on input board 151. In use, power converter 175 provides direct current (DC) power to selected components of power supply circuit 119 from the AC mains input.

For ease of assembly, power supply circuit 119 additionally includes a second, or main, printed circuit board 181 which retains the majority of the electrical components that are used to ensure optimal operation of static bars 13 as well as protect against potentially catastrophic arc-over conditions. Notably, mounted on main board 181 are (i) current measurement circuit 131, which is designed to measure the total load current $i_{LOAD}$ and determine the ionization current generated by static bars 13, (ii) a voltage measurement circuit 135, which is designed to measure the total output voltage $V_{OUT}$ and determine the discharge voltage of static bars 13, (iii) user-programmable microprocessor 171 for controlling the principal operations of power supply 15, (iv) a digital display 183 for providing status information and measured readings to the user, and (v) a multi-output DC-DC switch-mode power converter 185 for supplying DC power derived from converter 175 to selected components on main board 181.

Current measurement circuit 131 is represented herein as comprising (i) a transimpedance amplifier 187 that is connected to terminating ground wire 133 of high-voltage secondary winding 125, (ii) an ionization-current signal processing circuit 189 connected to both the output of amplifier 187 as well as terminating ground wire 133 of high-voltage secondary winding 125, and (iii) a load-current signal processing circuit 191 connected to both the output of amplifier 187 as well as terminating ground wire 133 of high-voltage secondary winding 125. In use, amplifier 187 converts power-supply load current $i_{LOAD}$ to a differential-voltage signal for subsequent processing by signal processing circuits 189 and 191. In turn, circuit 189 generates a voltage signal proportional to the ionization current, whereas circuit 191 generates a voltage signal proportional to total load current $i_{LOAD}$, both signals to be continuously collected and monitored by microcontroller 171. As will be explained further in detail below, ionization-current measurement circuit 189 is specifically designed to measure the ionization current from static bars 13 through isolation of a harmonic distortion from the measured output load current $i_{LOAD}$ that is directly attributable to the ionization current.

Voltage measurement circuit 135 is represented herein as comprising (i) a discharge-voltage signal processing circuit 193 with a first input connected to terminating output wire 137 of low-voltage secondary winding 129, a second input connected to ground, and an output connected to microprocessor 171, and (ii) an output-voltage signal processing circuit 195 similarly arranged with a first input connected to terminating output wire 137 of low-voltage secondary winding 129, a second input connected to ground, and an output connected to microprocessor 171. In use, circuit 193 generates a voltage signal proportional to the discharge voltage of static bars 13, whereas circuit 195 generates a voltage signal proportional to the total output voltage $V_{OUT}$ provided to static bars 13 via terminating output wire 197 of high-voltage secondary winding 125, both signals to be continuously collected and monitored by microcontroller 171.

As will be explained further in detail below, discharge-voltage measurement circuit 193 is specifically designed to measure static bar discharge voltage through isolation of a harmonic distortion from the measured output voltage $V_{OUT}$ that is directly attributable to the discharge voltage. Thus, by isolating certain harmonics, circuit 193 can accurately measure the discharge voltage of static bars 13 and thereby effectively protect against potentially hazardous full-discharge events, which is a principal object of the present invention.

It should be noted that, although the voltage readings collected by circuits 193 and 195 via terminating wire 137 may deviate by approximately 10% of the actual output voltage $V_{OUT}$ (i.e. due to voltage generated across resistive output coupler 117), any measured deviance remains fixed and stable. As a result, total output voltage measurements using terminating wire 137 is deemed acceptable.

Each of circuits 189 and 193 preferably includes at least some of the following components: bandpass amplifiers, programmable-gain amplifiers, bandpass filters, full-wave rectifiers, and low-pass amplifiers. Through the careful selection and tuning of the aforementioned components, narrow-bandpass filtering and attenuation can be achieved, which is essential in isolating certain waveform harmonics. In addition, the aforementioned components allow for processing gain to be adjusted, thereby allowing for the auto-calibration, or correction, of residual DC-voltage offsets which may otherwise contribute to analog-to-digital conversion errors.

Accordingly, it is to be understood that adequate dynamic range must be maintained in order to ensure measurement accuracy of each of circuits 189 and 193. Most notably, it has been found that the nonlinear performance of each of signal-processing circuits 189 and 193 may introduce additional even-order harmonics which could potentially compromise the accuracy in measuring the ionization current and the discharge voltage, respectively. Furthermore, because ionization current and discharge voltage constitute very small percentages of the overall output load current $i_{LOAD}$ and output voltage $V_{OUT}$, respectively, accurate measurement can be particularly difficult. As a result, active bandpass filtering is implemented in each of circuits 189 and 193 to minimize the effect of nonlinear components in power supply circuit 119. In this manner, processing gain is sufficiently increased when measuring the ionization current and discharge voltage.

As noted above, programmable microcontroller 171 regulates the principal operations of power supply 15. Microcontroller 171 represents any processor that can be programmed with firmware to compile current and voltage measurements and, upon detecting readings that exceed user-defined thresholds, initiate a user-defined response. As can be seen, microcontroller 171 is adapted for firmware updates and/or adjustments to user-specified thresholds and responses, through a designated connective interface 199 in electrical connection therewith, interface 199 being represented herein as a pair of input/output ports which are preferably mounted in power supply chassis 111. As such, operation of power supply 15 can be readily customized by the user based on the needs of the intended application, which is highly desirable. Microcontroller 171, through interface 199, can also communicate alarms and status and measurement readings to remote automation equipment.

Display 183 is in electrical communication with microcontroller 171 and is therefore capable of providing critical status information and collected measurements to the user. Although not shown in FIG. 4, display 183 is preferably mounted within chassis 111 in alignment with a corresponding opening or transparent window in its top panel so as to be externally viewable.

Display 183 is represented in FIG. 6 as comprising three separate 7-segment digital display screens, represented generally by reference numeral 201, which together provide information and/or measurements relating to, inter alia, total load current $i_{LOAD}$, total output voltage $V_{OUT}$, ionization current, discharge voltage, as well as a multitude of alarm and status codes. Display 183 additionally includes one or more light emitting diodes (LEDs), represented generally by reference numeral 203, which provide certain basic operational indicators, such as on/off status, alarm activation status, and the like.

Output coupler 117 is preferably constructed as a modular unit which is connected to high-voltage secondary winding 125 via terminating output wire 197. In the present embodiment, coupler 117 is shown as comprising four separate connectors 205, each of which is adapted to readily receive a capacitive load, such as an ionizing bar 13. Coupler 117 is additionally shown as comprising a pair of damping resistors 207, which control the output voltage $V_{OUT}$ and total load current $i_{LOAD}$ supplied to static bars 13 to an acceptable level.

Operation of Power Supply 15

Upon initial activation, or firmware reset, of power supply 15, microcontroller 171 is programmed to engage in a one-time startup routine to properly calibrate monitoring circuit 127 for subsequent measurements. During execution of the start-up routine, microcontroller 171 preferably transmits user-intuitive indicators on display 183 to reflect certain aspects of the start-up procedure.

Upon completion of the start-up process, power supply 15 engages in an ordered cycle of measurements. As the first step in the cycle, microcontroller 171 retrieves a discharge voltage measurement from discharge voltage signal processing circuit 193 and, in turn, displays the results of the measurement on display 183. Using the collected measurement, microcontroller 171 determines whether an arc-over condition exists that requires intervention, the details of the process of detecting and intervening such a condition being set forth further below.

In the second step of the cycle, microcontroller 171 retrieves an output load current measurement from load current signal processing circuit 191 and, in turn, displays the results of the measurement on display 183. Thereafter, in the third step of the cycle, microcontroller 171 retrieves a total output voltage measurement from output voltage signal processing circuit 195 and, in turn, displays the results of the measurement on display 183. Finally, in the fourth step of the cycle, microcontroller 171 retrieves an ionization current measurement from ionization current signal processing circuit 189 and, in turn, displays the results of the measurement on display 183. The aforementioned cycle repeats indefinitely until either (i) manual or automatic shutdown of power supply 15 or (ii) initiation of a firmware-reset event.

As noted above, monitoring circuit 127 is specifically programmed to monitor both (i) ionization current, in order to ensure proper operation of static bars 13, and (ii) discharge voltage, in order to detect any arc-over conditions experienced by static bars 13. The details of how circuit 127 engages in such processes, and in turn implements any programmed response, is set forth in detail below.

Detection of Ionization Degradation

Traditionally, the measurement of ionization current (i.e. the electric current produced in the ionized gas of a generated field) in conventional AC static-neutralization systems was prohibitively difficult and expensive to implement due to the presence of the considerably larger displacement current that is required to drive the overall capacitive load, both currents being delivered together as part of the total output, or load, current $i_{LOAD}$ from the power supply.

However, as part of the present invention, applicant has recognized that certain harmonics of the operating frequency of the total load current $i_{LOAD}$ from power supply 15 are directly attributable to the largely nonlinear ionization current, whereas other harmonics are directly attributable to the largely linear overall load impedances. Accordingly, by examining certain AC signal harmonics of the power-supply load current $i_{LOAD}$, the ionization current can be readily isolated and, in turn, continuously monitored to identify any degradation of ion field generation (e.g. as a result of particulate accumulation on any of the individual static bars 13).

More specifically, applicant has recognized that the inherently nonlinear ionization loads associated with static neutralization systems creates asymmetry between the positive and negative lobes of the AC power signal. In particular, the fact that positive ions generated from each static bar 13 have a higher ionization energy than the similarly generated negative ions creates asymmetry in the total AC power signal delivered from power supply 15. More specifically, the positive lobe of the AC ionization-current waveform at each discharging electrode 35 is typically wider and with a compensatory lower-magnitude peak than the negative lobe of the waveform. This AC signal asymmetry, in turn, creates even-order distortion in the waveform that is readily measurable and therefore can be used to determine the ionization current produced from static bars 13.

Figure 7:
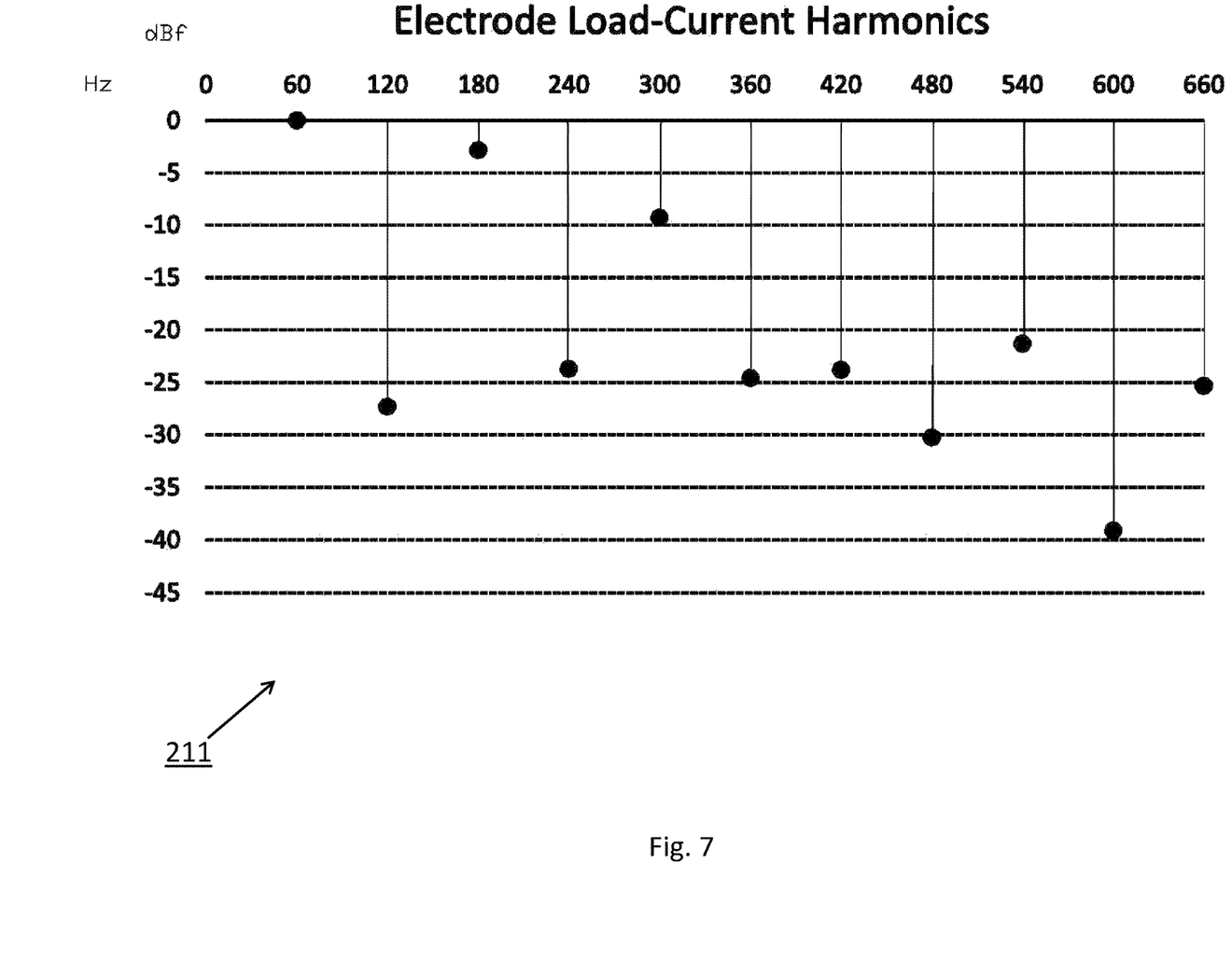
FIG. 7 is a graph depicting actual test results achieved by a model of the static-neutralization system of FIG. 1, the test results being useful in illustrating the effect of the ionizing current on the even-order harmonics of the total load current output from the power supply.

As evidenced in chart 211 shown in FIG. 7, the even-order harmonics, which are directly attributable to the nonlinear components (e.g. ionization current), are considerably lower (approximately 25 dB) than the fundamental frequency component (e.g. 50 or 60 Hz) of the total load current $i_{LOAD}$ delivered from power supply 15. The even-order harmonic distortion of the total load current $i_{LOAD}$ is induced by the intrinsic properties of partial discharge in an air-ionizing load. In the present invention, measurement circuit 127 is preferably tuned to utilize the $2^{nd}$ harmonic of total load current $i_{LOAD}$ to measure and monitor the ionization current.

Using the principles set forth above, current monitoring circuit 131 is adapted to continuously monitor, with great precision, both the total load current $i_{LOAD}$ as well as the ionization current. Any detected decrease in the ionization current beneath a user-programmable threshold preferably triggers microcontroller 171 to initiate a defined response (e.g. an alert on display 183). Therefore, through continuous monitoring of both currents, current monitoring circuit 131 is able to monitor system performance, immediately identify ion generation degradation, and provide any useful diagnostic data associated therewith.

To optimize operation, ionization-current signal processing circuit 189 is preferably designed with adequate dynamic range to compile both the relatively large odd-order harmonics, which are attributable to both linear and nonlinear non-air (e.g. solid-dielectric) components of system 11, as well as the comparatively small even-order harmonics, which are more directly attributable to ion generation. Thus, by isolating the even-order harmonics (i.e. by filtering components of the signal attributable to non-ionizing loads), circuit 189 can accurately measure the ionization current produced by static bars 13 and thereby monitor ion generation efficiency, which is a principal object of the present invention.

It should be noted that certain aspects of ion generation efficiency may be attributable to external factors, such as variances in ambient air characteristics, such as humidity, barometric pressure and temperature. However, it is to be understood that ion generation degradation due to external factors is typically smaller and slower than ion generation inefficiencies due to equipment degradation. Due to these notable differences in ion generation characteristics, any reduction in ion generation due to performance degradation can be readily identified.

It should be noted that the present invention is not limited to any particular harmonic of the total load current $i_{LOAD}$ to measure and monitor the ionization current. For instance, in the present invention, even-order harmonic distortion was preferred over odd-order harmonic distortions as a measurable indicator of ionization current for capacitively-coupled static bars 13. Nonetheless, it is envisioned that, in certain alternative systems (e.g. resistively-coupled ionization systems with a more dominant anion generation and commensurate positive waveform lobe), odd-order harmonics may be more suitable for ionization current measurement. Accordingly, it is to be understood that the present invention is not limited to any particular harmonic for measuring ionization current, but rather could select the most optimal harmonic for measuring ionization current based on the inherent properties of the particular ionization system.

Detection of Arc-Over Conditions

As noted above, applicant has recognized a direct, measurable correlation between the discharge voltage (i.e. the output voltage induced through ion generation) and certain harmonics of the operating frequency of the larger output voltage $V_{OUT}$ delivered from power source 15. In particular, applicant has recognized that transients associated with full-discharge events (e.g. induced by an incipient or developed dielectric fault within ionization system 11) introduce considerably unstable waveform characteristics in the power-supply output voltage $V_{OUT}$ due to collapses within the generated electric field, which recover at least once per half-cycle of the operating frequency. By contrast, the measured output voltage $V_{OUT}$ during ideal operating conditions (i.e. resulting in a partial discharge) produces a highly stable and continuous waveform. Therefore, any instability, or randomness, in power supply output voltage waveform, which is normally stable and continuous from cycle-to-cycle, creates time-variant harmonic distortions that can be readily measured, thereby providing an immediate, real-time indication of transient full discharge (e.g. due to dielectric breakdown).

Additionally, applicant has recognized that the characteristics of the breakdown of air produce an asymmetry between conditions of positive and negative applied voltages and induced electric fields. Accordingly, it has been found that certain even-order harmonics of the measured output voltage $V_{OUT}$ exhibit enhanced sensitivity to arcing conditions. Furthermore, due to the larger degree of frequency separation between the fundamental frequency and the $4^{th}$ harmonic as compared to the fundamental frequency and the $2^{nd}$ harmonic, signal processing of the $4^{th}$ harmonic is particularly ideal for full discharge detection, since it provides adequate dynamic range with less complex and expensive bandpass filtering.

Upon detecting an arc-over, or full-discharge, event, microcontroller 171 is designed to initiate an automatic, immediate response. For instance, microcontroller 171 may provide an alert to the user via display 183. In this manner, the user can examine system 11 to determine whether any further response is required (e.g. replacement of a visibly damaged static bar 13).

Additionally, microcontroller 171 may be programmed to temporarily reduce the output voltage $V_{OUT}$ delivered to static bars 13 to minimize the risk of potentially catastrophic conditions (e.g. smoke or flame due to the melting and/or burning of polymer materials in the ionization equipment). In the present embodiment, voltage attenuation is achieved through automated closure of switch 163 for a user-modifiable period of time, which is counted by microcontroller 171.

Thereafter, microcontroller 171 preferably engages in an arc-condition retest for a fixed period of time (e.g. 1 second). Specifically, microcontroller 171 opens switch 163 (i.e. so as to deliver full power to bars 13) and commences a retest counter. Automated monitoring of the discharge voltage signal is then resumed by monitoring circuit 127 to determine whether the arc condition has been permanently suppressed or, in the alternative, experiences regeneration. If regeneration persistence exceeds a defined time limit, and if microcontroller 171 is programmed to arm triggering of automated shutdown, system 11 is powered down by microcontroller 171 by means of actuating thermal breaker 145, thus fully eliminating any potential arc-over until manual inspection, troubleshooting and repair of the equipment takes place.

As a feature of the invention, it should be noted that periodic, automated voltage attenuation may be sufficient enough to minimize the effects of arc-over events during continued operation of system 11. Because microcontroller 171 is directly programmable by the user, the dedicated response to the detection of a full-discharge event response can be customized by the user depending upon the intended application. In other words, in a highly sensitive environment (e.g. in the presence of volatile air vapors), microcontroller 171 would be preferably programmed with a greater reluctance to allow for repeated, intermittent arc-overs.

The invention described in detail above is intended to be merely exemplary and those skilled in the art shall be able to make numerous variations and modifications to it without departing from the spirit of the present invention. All such variations and modifications are intended to be within the scope of the present invention as defined in the appended claims.

What is claimed is:

1. A high-voltage power supply for at least one alternating current (AC) ionizing device, the AC ionizing device being adapted to produce an ionized electric field having a discharge voltage and an ionization current, the high-voltage power supply comprising:
    (a) a transformer for generating a high-voltage AC power signal to be delivered to the at least one AC ionizing device, the high-voltage AC power signal comprising a load current and an output voltage; and
    (b) a monitoring circuit in electrical connection with the transformer, wherein the monitoring circuit measures the load current produced by the transformer and is adapted to isolate at least one non-fundamental harmonic of the load current to determine the ionization current.

2. The high-voltage power supply as claimed in claim 1 wherein the transformer is adapted to receive AC mains electricity via a primary winding.

3. The high-voltage power supply as claimed in claim 2 wherein the transformer delivers the high-voltage power signal via a high-voltage secondary winding.

4. The high-voltage power supply as claimed in claim 3 wherein the transformer produces a low-voltage power signal via a low-voltage secondary winding.

5. The high-voltage power supply as claimed in claim 3 wherein the monitoring circuit measures the load current using the high-voltage secondary winding.

6. The high-voltage power supply as claimed in claim 3 wherein the monitoring circuit isolates an even-order harmonic of the load current to determine the ionization current.

7. The high-voltage power supply as claimed in claim 6 wherein the monitoring circuit isolates the $2^{nd}$ harmonic of the load current to determine the ionization current.

8. The high-voltage power supply as claimed in claim 3 further comprising a microcontroller for comparing the ionization current against a defined threshold.

9. The high-voltage power supply as claimed in claim 8 further comprising a display in communication with the microcontroller, the microcontroller initiating an alert on the display when the ionization current falls beneath the defined threshold.

10. The high-voltage power supply as claimed in claim 8 wherein the microcontroller is adapted to transmit alerts to remote automation equipment when the ionization current falls beneath the defined threshold.

11. The high-voltage power supply as claimed in claim 8 wherein the microcontroller is adapted to transmit at least one of the group consisting of alarms, operational status, and readings data to remote automation equipment upon request.

12. The high-voltage power supply as claimed in claim 4 wherein the monitoring circuit measures the output voltage produced by the transformer.

13. The high-voltage power supply as claimed in claim 12 wherein the monitoring circuit measures the output voltage using the low-voltage secondary winding.

14. The high-voltage power supply as claimed in claim 12 wherein the monitoring circuit isolates a non-fundamental harmonic of the output voltage to determine the discharge voltage.

15. The high-voltage power supply as claimed in claim 14 wherein the monitoring circuit isolates an even-order harmonic of the output voltage to determine the discharge voltage.

16. The high-voltage power supply as claimed in claim 15 wherein the monitoring circuit isolates the $4^{th}$ harmonic of the output voltage to determine the discharge voltage.

17. The high-voltage power supply as claimed in claim 14 further comprising a microcontroller for comparing the discharge voltage against a defined threshold.

18. The high-voltage power supply as claimed in claim 17 wherein the monitoring circuit comprises an arc-over suppression circuit in electrical communication with the microcontroller, the arc-over suppression circuit selectively attenuating the output voltage delivered to the at least one AC ionizing device.

19. The high-voltage power supply as claimed in claim 18 wherein the suppression circuit attenuates the output voltage delivered to the at least one AC ionizing device when the microcontroller determines that the discharge voltage exceeds the defined threshold.

20. The high-voltage power supply as claimed in claim 19 wherein the suppression circuit terminates attenuation of the output voltage delivered to the at least one AC ionizing device after a defined period of time.

21. The high-voltage power supply as claimed in claim 19 wherein the microcontroller is programmed to automatically disconnect delivery of AC mains electricity to the transformer when the discharge voltage continuously exceeds the defined threshold for a defined period of time.

* * * * *